US008806215B2

(12) United States Patent
Chen et al.

(10) Patent No.: US 8,806,215 B2
(45) Date of Patent: *Aug. 12, 2014

(54) METHOD AND SYSTEM FOR ROBUST WATERMARK INSERTION AND EXTRACTION FOR DIGITAL SET-TOP BOXES

(75) Inventors: Sherman Xuemin Chen, San Diego, CA (US); Stephane Rodgers, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/604,914

(22) Filed: Sep. 6, 2012

(65) Prior Publication Data

US 2012/0328149 A1  Dec. 27, 2012

Related U.S. Application Data

(63) Continuation of application No. 11/952,772, filed on Dec. 7, 2007, now Pat. No. 8,380,993.

(51) Int. Cl.
 H04L 9/32 (2006.01)
 H04N 7/167 (2011.01)

(52) U.S. Cl.
 USPC ............ 713/176; 713/178; 380/200; 380/202

(58) Field of Classification Search
 USPC .......... 713/176–179, 192–194; 380/200–202, 380/240–241
 See application file for complete search history.

(56) References Cited

U.S. PATENT DOCUMENTS 6,141,753 A 10/2000 Zhao et al.
6,523,113 B1 2/2003 Wehrenberg
(Continued)

FOREIGN PATENT DOCUMENTS

| EP | 1 009 126 A1 | 6/2000 |
| KR | 2005-62243 | 6/2005 |
| KR | 2007-81843 | 8/2007 |
| WO | WO 01/076252 A2 | 10/2001 |

OTHER PUBLICATIONS

European Search Report corresponding to European Patent Application Serial No. 08020192.4-2223, dated Mar. 6, 2009; 2 pages.

(Continued)

Primary Examiner — Darren B Schwartz
(74) Attorney, Agent, or Firm — Sterne, Kessler, Goldstein & Fox P.L.L.C.

(57) ABSTRACT

Methods and systems for robust watermark insertion and extraction for digital set-top boxes are disclosed and may include descrambling, detecting watermarking messages in a received video signal utilizing a watermark message parser, and immediately watermarking the descrambled video signal utilizing an embedded CPU. The embedded CPU may utilize code that may be signed by an authorized key, encrypted externally to the chip, decrypted, and stored in memory in a region off-limits to other processors. The video signal may be watermarked in a decompressed domain. The enabling of the watermarking may be verified utilizing a watchdog timer. The descriptors corresponding to the watermarking may be stored in memory that may be inaccessible by the main CPU. The watermark may comprise unique identifier data specific to the chip and a time stamp, and may be encrypted utilizing an on-chip combinatorial function.

20 Claims, 3 Drawing Sheets

(56) References Cited

U.S. PATENT DOCUMENTS

| | | |
|---|---|---|
| 6,674,858 B1 | 1/2004 | Kimura et al. |
| 7,203,967 B2 | 4/2007 | Chmaytelli et al. |
| 8,380,993 B2* | 2/2013 | Chen et al. .................. 713/176 |
| 2001/0044899 A1 | 11/2001 | Levy |
| 2001/0047478 A1* | 11/2001 | Mase ........................ 713/176 |
| 2002/0017977 A1 | 2/2002 | Wall |
| 2002/0061122 A1 | 5/2002 | Fujihara et al. |
| 2002/0112171 A1 | 8/2002 | Ginter et al. |
| 2002/0118827 A1 | 8/2002 | Luyster |
| 2002/0172395 A1 | 11/2002 | Foote et al. |
| 2002/0191810 A1* | 12/2002 | Fudge et al. ................ 382/100 |
| 2003/0028761 A1 | 2/2003 | Platt |
| 2003/0061489 A1 | 3/2003 | Pelly et al. |
| 2003/0110130 A1 | 6/2003 | Pelletier |
| 2003/0120940 A1 | 6/2003 | Vataja |
| 2003/0123659 A1 | 7/2003 | Forstrom et al. |
| 2003/0126445 A1 | 7/2003 | Wehrenberg |
| 2003/0152225 A1* | 8/2003 | Kunisa ........................ 380/210 |
| 2003/0215110 A1 | 11/2003 | Rhoads et al. |
| 2004/0005078 A1 | 1/2004 | Tillotson |
| 2004/0025011 A1 | 2/2004 | Azema et al. |
| 2004/0071287 A1* | 4/2004 | Alexander .................... 380/29 |
| 2004/0078594 A1 | 4/2004 | Scott |
| 2004/0091111 A1 | 5/2004 | Levy et al. |
| 2004/0221244 A1 | 11/2004 | Baldino |
| 2004/0223612 A1 | 11/2004 | Kamijoh et al. |
| 2004/0258243 A1 | 12/2004 | Shin et al. |
| 2005/0055574 A1 | 3/2005 | Chmaytelli |
| 2005/0071651 A1 | 3/2005 | Aguilar, Jr. et al. |
| 2005/0091367 A1* | 4/2005 | Pyhalammi et al. .......... 709/224 |
| 2005/0186965 A1 | 8/2005 | Pagonis et al. |
| 2006/0123248 A1 | 6/2006 | Porter et al. |
| 2006/0143233 A1 | 6/2006 | Pietraski |
| 2006/0193474 A1* | 8/2006 | Fransdonk .................... 380/279 |
| 2007/0074035 A1 | 3/2007 | Scanlon et al. |
| 2007/0106901 A1 | 5/2007 | Collens et al. |
| 2007/0237327 A1* | 10/2007 | Taylor et al. .................... 380/37 |
| 2007/0242853 A1 | 10/2007 | Rodriguez et al. |
| 2007/0292034 A1 | 12/2007 | Tabankin |
| 2008/0219494 A1* | 9/2008 | Chen ............................. 382/100 |
| 2008/0228821 A1 | 9/2008 | Mick et al. |
| 2009/0136081 A1* | 5/2009 | Mamidwar et al. .......... 382/100 |
| 2009/0150676 A1 | 6/2009 | Chen et al. |
| 2009/0290711 A1* | 11/2009 | Bloom et al. ................. 380/239 |

OTHER PUBLICATIONS

Sarmast et al., "Biometric signing of photographs to verify authenticity." Research Disclosure, vol. 491, No. 74, Mar. 1, 2005; 2 pages.

English-Language machine translation of the description and claims of Korean Patent Publication No. 2005-62243 A, published Jun. 23, 2005; 15 pages.

English-Language Abstract of Korean Patent Publication No. 2007-81843 A, published Aug. 20, 2007; 1 page.

* cited by examiner

METHOD AND SYSTEM FOR ROBUST WATERMARK INSERTION AND EXTRACTION FOR DIGITAL SET-TOP BOXES

CROSS-REFERENCE TO RELATED APPLICATIONS/INCORPORATION BY REFERENCE

This application is a continuation of U.S. application Ser. No. 11/952,772, filed on Dec. 7, 2007, and incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to digital media protection. More specifically, certain embodiments of the invention relate to a method and system for robust watermark insertion and extraction for digital set-top boxes.

BACKGROUND OF THE INVENTION

Watermarking is a technique utilized to protect digital media from unauthorized use or illegal copying, such as with copyrighted material, for example. Watermarking of digital media may fall into two categories: visible or invisible. Visible watermarks are typically added to digital images to indicate ownership and to thwart unauthorized use of the images. The watermark may comprise the identity of the owner and/or a copyright symbol and date, for example. This type of watermark may be considered a spatial watermark in that the data is embedded spatially in an image, and the watermark signal is distinct from the original image data. Spatial watermarks may not be robust against attacks due to the ability of filtering, removing and/or cropping the data.

Invisible watermarks do not change the image to a perceptible extent. This may be accomplished by minor changes in the least significant bits of the original data. Watermarks that are unknown to the end user may be considered steganographic.

A watermarking process may embed the data in the frequency domain, making it more robust against attack. The technique is similar to spread spectrum encoding in communications, where the data to be embedded may be spread over a multitude of frequencies by modulating the watermark signal with pseudo-noise before adding it to the original data. The low signal amplitude, due to the watermark being invisible, the large bandwidth of the original data (image or video, for example), and the shortness of the watermark message, are all factors that indicate spread spectrum encoding is a logical choice.

In addition to embedding a watermark in digital multimedia data, detecting whether a watermark is present may also be important in the protection of multimedia data. Multimedia players may include watermark sensing electronics to preclude the use of unauthorized or pirated media.

Further limitations and disadvantages of conventional and traditional approaches will become apparent to one of the art, through comparison of such systems with the present invention as set forth in the remainder of the present application with reference to the drawings.

BRIEF SUMMARY OF THE INVENTION

A system and/or method for secure watermark insertion and extraction in the compressed video domain, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for robust watermark insertion and extraction for digital set-top boxes. Exemplary aspects of the invention may comprise descrambling, detecting watermarking messages in a received video signal utilizing a watermark message parser and immediately watermarking the descrambled video signal utilizing an embedded CPU according to the detected watermarking messages. The watermarked video signal may be stored in memory that may be inaccessible by a main CPU and then decoded prior to display. The embedded CPU may utilize code that may be signed by an authorized key and may not be visible to other processors. The code for the embedded CPU may be encrypted externally to the chip, decrypted, and stored in memory in a region off-limits to other processors. The video signal may be watermarked in a decompressed domain. The enabling of the watermarking may be verified utilizing a watchdog timer. The descriptors corresponding to the watermarking may be stored in memory that may be inaccessible by the main CPU. The watermark may comprise unique identifier data specific to the chip and a time stamp or other time indicator. The unique identifier data may be encrypted utilizing an on-chip combinatorial function. The watermark messages in the received video signal may be inserted at a head-end which generates the received video signal prior to encryption. The inserted watermark messages may be encrypted using a unique algorithm. The inserted watermark messages may be removed immediately following the detecting of the watermark messages by the watermark message parser.

Figure 1:
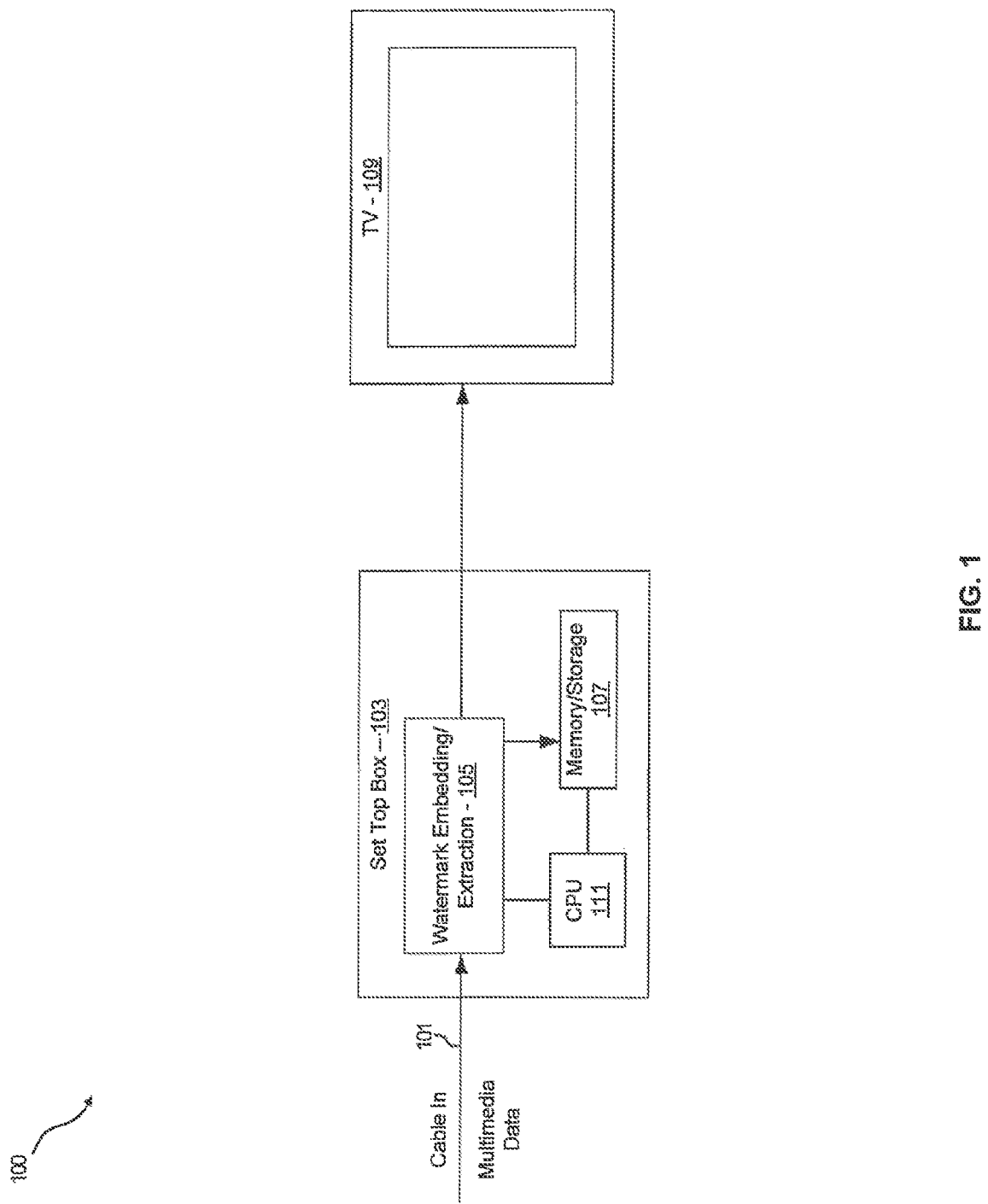
FIG. 1 is an exemplary application of a digital watermarking process, in accordance with an embodiment of the invention.

FIG. 1 is an exemplary application of a digital watermarking process, in accordance with an embodiment of the invention. Referring to FIG. 1, there is shown watermark embedding and extraction application 100 comprising a cable input 101, a television 109 and a set top box 103 comprising a watermark embedding/extraction block 105, a memory/storage 107 and a CPU 111. The cable input 101 may communicate multimedia signals comprising audio, video, data and/or voice, for example.

The set top box 103 may comprise suitable circuitry, logic and/or code for receiving multimedia input signals and generating an output signal that may be displayed on the television 109. The memory/storage 107 may comprise suitable circuitry, logic and/or code for storing multimedia data received from the cable input 101 that may have been processed by the watermark embedding/extraction block 105. The memory/storage 107 may also be enabled to store data that may be utilized by the CPU 111 for controlling various aspects of operation of the set top box 103. The CPU 111 may also be enabled to control certain aspects of the watermark embedding/extraction block 105, except for secure operations that may be controlled by an on-chip embedded CPU, as described with respect to FIG. 2. Although a cable input 101 is shown, the invention is not so limited. Accordingly, other media inputs such as, for example, a satellite feed may be provided as an input to the set top box 103.

The watermark embedding/extraction block 105 may comprise suitable circuitry, logic and/or code for receiving multimedia data from, for example, the cable input 101 and embedding or extracting a digital watermark in the data. The digital watermark may comprise encrypted data regarding the source of the multimedia data and/or the set top box 103 such that should the data later be discovered as pirated, the source of the pirated data may be determined, for example. In an embodiment of the invention, the watermark embedding may be performed on compressed data. The encrypted message in the data may only be detected with appropriate watermark detection circuitry.

In operation, multimedia data may be communicated to the set top box 103 via the cable input 101. In instances where it may be desired that the multimedia data be protected from illegal copying or use, for example, such as with copyrighted material, the watermark embedding/extraction block 105 may embed a watermark in compressed multimedia data before storing in the storage 107 and/or decompressing the data and communicating to the television 109.

Watermark embedding may be considered as a function that involves the original media (content) data $\nabla$, an embedding key $\overline{K}$, a set of parameters $\overline{P}$ that control the embedding procedure/algorithm, and a message M that may be embedded in the video and/or audio. The message data $\overline{M}$ may be considered as a sequence of bits. The set of parameters $\overline{P}$ may contain, among other things, the so-called watermark embedding factor, i.e. a parameter that controls the amount of degradation that may be inflicted on the original media data by the watermark. The output of the watermark embedding function comprise watermarked data $\overline{W}$. Thus, the watermark embedding function may be of the following form:

$$\overline{W} = f(\overline{V}, \overline{K}, \overline{M}, \overline{P}).$$

Figure 2:
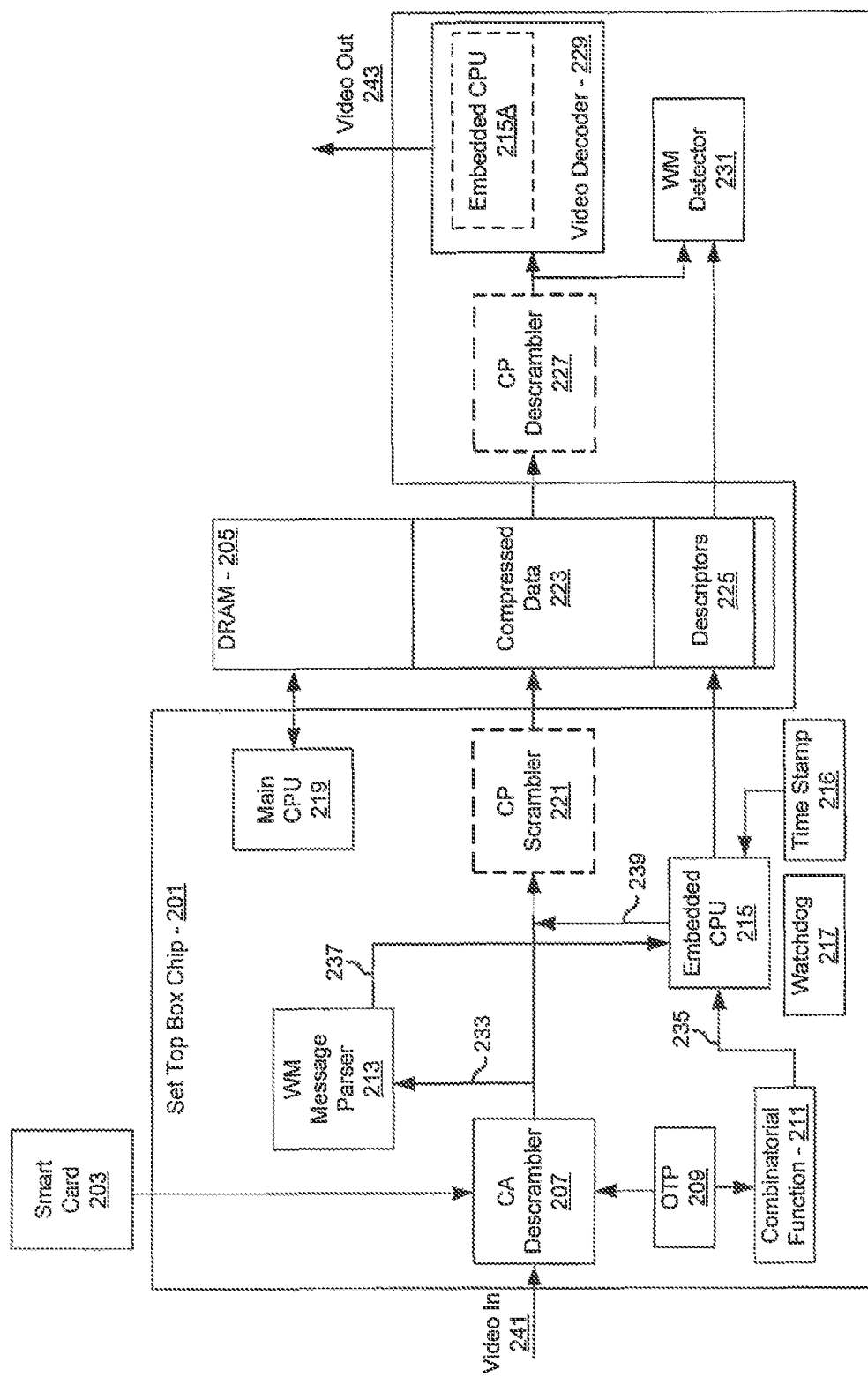
FIG. 2 is a block diagram illustrating a robust watermarking system, in accordance with an embodiment of the invention.

FIG. 2 is a block diagram illustrating a robust watermarking system, in accordance with an embodiment of the invention. Referring to FIG. 2, there is shown a set top box chip 201, a smart card 203 and a DRAM 205. The set top box chip 201 may comprise a conditional access (CA) descrambler 207, a one-time programmable (OTP) memory 209, a combinatorial function block 211, a watermark message parser 213, an embedded CPU 215, a time stamp counter 216, a watchdog timer 217, a main CPU 219, a copy protection (CP) scrambler 221, a CP descrambler 227, a video decoder 229 and a watermark detector 231. There is also shown input and output signals, namely, video in 241 and video out 243, respectively.

The DRAM 205 may comprise suitable circuitry, logic and/or code that may enable storage of code to be used by the CPU 219 for control of the set top box 103. The DRAM 205 may also comprise the compressed data 223 and the descriptors 225. The compressed data 223 region of the DRAM 205 may comprise compressed and watermarked video data, and the descriptor 225 section of the DRAM 205 may comprise data that may be utilized by the watermark detector 231 to determine the location of the watermarks to verify that the watermarks were properly inserted. The compressed data 223 and the descriptors 225 may not be accessed by the main CPU 219, and may only be accessed by the embedded CPU 215, which may enhance system security.

The smart card 203 may comprise suitable circuitry, logic and/or code that may enable storage of data for the descrambling of the received video in 241. The data stored in the smart card 203 may comprise CA descrambling keys or service provider specific data, for example.

The CA descrambler 207 may comprise suitable circuitry, logic and/or code that may enable conditional access descrambling of received video signals. The CA descrambler may receive as inputs the input signal, video in 241, data stored in the smart card 203 and unique identifier data stored in the OTP 209. Video signals may be CA scrambled by a service provider to control access to content to authorized users only.

The OTP memory 209 may comprise suitable circuitry, logic and/or code that may enable storage of unique identifier data specific to the set top box chip 201, such that an embedded watermark may comprise information about the source of the data. Additionally, the OTP memory 209 may store keys to be utilized by the CA descrambler 207.

The combinatorial function block 211 may comprise suitable circuitry, logic and/or code that may enable combining, or scrambling of unique identifier data stored in the OTP 209 with a combinatorial function. The resulting unique ID 235 may be communicated to the embedded CPU 2.15 to be included in the watermark inserted into the video data.

The watermark message parser 213 may comprise suitable circuitry, logic and/or code that may enable "snooping" data from the CA descrambler 207 to detect watermarking messages that may be in the video data stream. In an exemplary embodiment of the invention, the watermark message parser 213 may comprise hardware, as opposed to software, to reduce and/or eliminate the ability of a hacker to interfere with the detection of watermarking messages. The watermark message parser may generate a trigger signal 237, which may trigger the embedded CPU 215 to initiate a watermark insertion process.

The embedded CPU 215 may comprise suitable circuitry, logic and/or code that may enable control of the watermark embedding process. The embedded CPU 215 may be entirely separate from the main CPU 219 so that software code from third parties, or hackers, may not affect the watermark embedding process. Accordingly, the embedded CPU 215 may utilize signed code only, which may prevent modification of the code by external means.

In addition to signing the code of the embedded CPU 215, the code may also be stored externally encrypted, in order to prevent exposing the watermark insertion or extraction algorithm. In such a case, the code of the embedded CPU 215 may be decrypted on-chip, then stored in a region of the DRAM 205 which may only be accessible to the embedded CPU 215, and off-limits to other processors. Storing the data in a non-CPU accessible region may help prevent theft of pre-watermarked data in instances where the watermark insertion occurs on the decompressed data. Furthermore, the DRAM 205 contents may only be written to DRAM in scrambled form, in order to prevent pin snooping which may reveal the contents of the embedded CPU code, or other sensitive watermark and non-watermark related parameters. The embedded CPU 215 may generate and insert the watermark 239 in the video data received from the CA descrambler 207.

In another embodiment of the invention, the embedded CPU 215 may insert the descriptors 225 in the DRAM 205, which may be utilized by the watermark detector 231 to identify the location of the watermarks in the video data and verify that they were properly inserted. The descriptors 225 may not be accessed by the main CPU 219, thus increasing the security level of the set top box chip 201. Additionally, the embedded CPU 215 may be enabled to insert watermark video before or after storage in the compressed data 223 of the DRAM 205.

The time stamp counter 216 may comprise suitable circuitry, logic and/or code that may enable insertion of the time-of-day and date information into the watermark itself, so that a suspect stream can be analyzed to see when it was recorded.

The watchdog timer 217 may comprise suitable circuitry, logic and/or code that may detect whether the embedded CPU 215 may be functioning and responding to interrupts from the watermark message parser 213. In instances where the watchdog timer 217 may determine that the embedded CPU 215 may be incorrectly configured or enabled by an unauthorized entity, the set top box chip 201 may be disabled. Accordingly, the watchdog timer 217 may require a watermark insertion interrupt periodically. If enough time elapses without seeing a watermark insertion interrupt, then the system may be considered "hacked", and the watchdog timer 217 may reset the chip, or take other action which makes the set top box chip 201 unusable.

The main CPU 219 may comprise suitable circuitry, logic and/or code that may enable overall functional control of the set top box 103. The main CPU 219 may access the DRAM 205, but may not have access to the compressed data 223 or the descriptors 225 in the DRAM 205. For example, the main CPU 219 may be utilized to update and/or modify programmable parameters and/or values in a plurality of components, devices, and/or processing elements in the set top box 103, described with respect to FIG. 1.

The CP scrambler 221 may comprise suitable circuitry, logic and/or code that may enable scrambling the watermarked signal before storing in the compressed data 223 section of the DRAM 205. The CP scrambler 221 may enhance security of the system by reducing and/or eliminating a hacker's ability to intercept unscrambled video, and may comprise an optional system component, depending on the security requirements of the set top box 103, described with respect to FIG. 1. In instances where the watermark may be inserted in video after being read from the compressed data 223 and before the video decoder 229, scrambling the data to be stored in the DRAM 205 may prevent the theft of pre-watermarked data.

The CP descrambler 227 ma comprise suitable circuitry, logic and/or code that may enable descrambling of CP scrambled data. In instances where the CP descrambler 227 may have been utilized to CP scramble the video signal received from the CA descrambler 207, the CP descrambler 227 may be utilized to descramble the signal before communicating the signal to the video decoder 229.

The video decoder 229 may comprise suitable circuitry, logic and/or code that may enable decoding a video for display on a monitor and/or television, such as the television 109 described with respect to FIG. 1. In another embodiment of the invention, the video decoder 229 may comprise an embedded CPU 215A for embedding a watermark into the video signal. The video decoder 229 may receive as an input the compressed data 223 stored in the DRAM 205, or from the CP descrambler 227 when implemented to descramble a CP scrambled signal and generate an output signal, video out 243.

The watermark detector 231 may comprise suitable circuitry, logic and/or code that may enable detecting the watermark 239 embedded in the video signal by the embedded CPU 215. By comparing the measured watermark to the descriptors 225 stored in the 225, the watermark detector 231 may verify the proper functioning of the watermark process in the set top box chip 201.

In operation, a CA scrambled signal may be communicated to the CA descrambler 207. The descrambler 207 may utilize descrambling keys and/or unique identifier data from the smart card 203 and the OTP memory 209 to descramble the input signal, video in 241. The descrambled signal may be parsed by the watermark message parser 213 to determine whether a watermark may be required to be inserted into the video data.

The watermark message parser 213 may generate a trigger signal 237 to enable the embedded CPU 215 to insert a watermark in to the descrambled video signal generated by the CA descrambler 207. The embedded CPU 215 may receive the unique ID 235 from the combinatorial function block 211 to generate a watermark 239 that may be specific to the set top box chip 201. In this manner, pirated content may be traced back to the set top box that may have generated the data. The embedded CPU 215 may also store the descriptors 225 in the DRAM 205 for watermark verification by the watermark detector 231.

The watermark messages may be encrypted, and may require an extra decryption step after the CA descrambling. This may prevent exposed CA descrambled data from compromising the underlying messaging and watermarking algorithm, since as soon as the watermark messages may be decrypted they may be removed from the stream in an alternative embodiment, the watermark messages may be removed and then decrypted.

In instances where CP scrambling may be desired prior to storage, the video signal with the watermark 239 inserted may be communicated to the CP scrambler 221. The resulting scrambled signal may be stored as the compressed data 223 in the DRAM 205. In instances where CP scrambling may not be required, the watermarked video signal may be stored directly as the compressed data 223 in the DRAM 205.

In instances where the CP scrambler 221 may have CP scrambled the watermarked video signal, the compressed data 223 in the DRAM 205 may be communicated to the CP descrambler 227. The resulting descrambled signal may be received by the video decoder 229 and the watermark detector 231. The watermark detector 231 may utilize the descriptors 225 in the DRAM 205 to verify the watermark detected in the watermarked video signal. In instances where the watermark detector 231 determines that the watermark detected in the watermarked video signal may not match the descriptors 225 in the DRAM 205, the set top box chip 201 may be disabled.

The video decoder 229 may decode the watermarked video signal generating an output signal, video out 243, for display on a television, such as the television 109, described with respect to FIG. 1.

Figure 3:
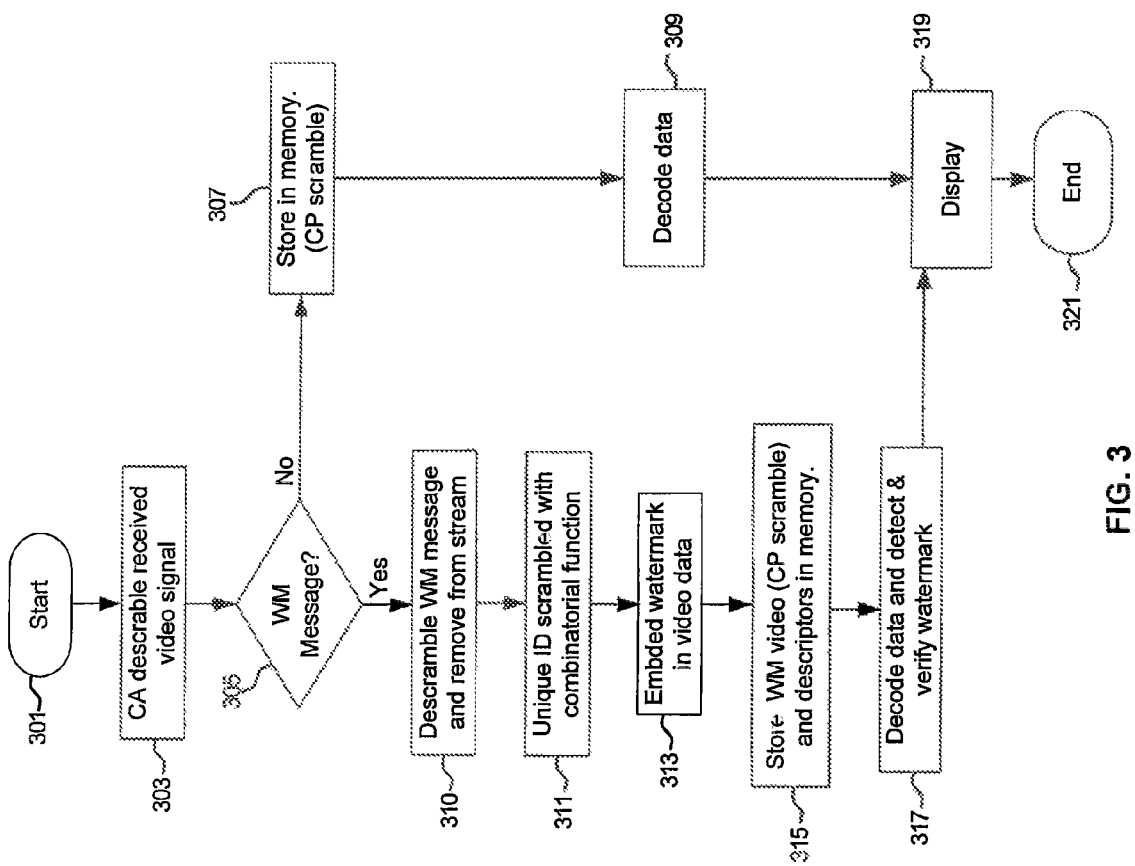
FIG. 3 is a flow diagram of an exemplary watermarking embedding and verification process, in accordance with an embodiment of the invention.

FIG. 3 is a flow diagram of an exemplary watermarking embedding and verification process, in accordance with an embodiment of the invention. In step 303, after start step 301, the received video signal may be CA descrambled. In step 305, if a watermark message is not present, the process may proceed to step 307, where the video signal may be stored in memory, and may optionally CP scramble the data before storing in memory. The exemplary steps may then proceed to step 309 where the video data may be decoded for display in step 319 followed by end step 321.

In step 305, in instances where a watermark message may be present, the exemplary steps may proceed to step 310 where the watermark message may be descrambled if it may be double encrypted and removed from the stream. In step 311, an ID unique to the set top box chip may be scrambled with a combinatorial function before proceeding to step 313 where the watermark comprising the scrambled unique ID may be embedded into the video data. In step 315, the watermarked video may be stored in memory that is not accessible by the main CPU and may CP scramble the data before storage. In step 317, the video data may be decoded and the watermark may be detected to verify that it was correctly embedded, followed by step 319 where the video data may be displayed, and finally end step 321.

In an embodiment of the invention, a method and system are disclosed for descrambling, detecting watermarking messages in a received video signal 241 utilizing a watermark message parser 213 and immediately watermarking the descrambled video signal utilizing an embedded CPU 215 according to the detected watermarking messages. The watermarked video signal may be stored in memory 223 not accessible by a main CPU 219 and then decoded prior to display. The embedded CPU 215 may utilize code that may be signed by an authorized key and may not be visible to other processors 219. The code for the embedded CPU 215 may be encrypted externally to the set top box chip 201, decrypted, and stored in memory in a region off-limits to other processors. The video signal may be watermarked in a decompressed domain. The enabling of the watermarking may be verified utilizing a watchdog timer 217. The descriptors 225 corresponding to the watermarking may be stored in memory that may be inaccessible by the main CPU 219. The watermark may comprise unique identifier data specific to the set top box chip 201 and a time stamp 216 or other time indicator. The unique identifier data may be encrypted utilizing an on-chip combinatorial function 211. The watermark messages in the received video signal 241 may be inserted at a head-end which generates the received video signal prior to encryption. The inserted watermark messages may be encrypted using a unique algorithm. The inserted watermark messages may be removed immediately following the detecting of the watermark messages by the watermark message parser 213.

Certain embodiments of the invention may comprise a machine-readable storage having stored thereon, a computer program having at least one code section for digital media processing, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for controlling watermarking processes in a chip, the chip including a first central processing unit (CPU) and a second CPU, the method comprising:
   descrambling, by the first CPU, a received video signal;
   extracting, by the first CPU, a watermarking message in the descrambled video signal;
   watermarking, by the second CPU, the descrambled video signal according to the extracted watermarking message to generate a watermarked video signal, wherein the watermarking message includes a time indicator and unique identifier data;
   scrambling the watermarked video signal to generate a scrambled video signal; and
   storing the scrambled video signal only in memory that is inaccessible by the first CPU.

2. The method according to claim 1,
   wherein the watermarking is based on a code or a configuration setting that is signed by an authorized key.

3. The method according to claim 2, further comprising:
   encrypting or decrypting the code or configuration setting; and
   storing the code in memory only in a region of the memory that is inaccessible to the first CPU.

4. The method according to claim 1, wherein the watermarking further comprises:
   watermarking the descrambled video signal in a decompressed domain.

5. The method according to claim 1, further comprising:
verifying whether the watermarking is enabled utilizing a watchdog timer.

6. The method according to claim 1, further comprising:
storing a descriptor corresponding to the watermarking only in the memory that is inaccessible by the first CPU.

7. The method according to claim 1, further comprising:
inserting the watermarking message in the received video signal at a head-end.

8. The method according to claim 7, further comprising:
encrypting the inserted watermarking message using a unique algorithm.

9. The method according to claim 8,
wherein the inserted watermarking message is extracted following a detection of the watermarking message.

10. A chip for digital media processing, comprising:
a central processing unit (CPU) configured to control functionality of a device;
a descrambler configured to descramble a received video signal to generate a descrambled video signal;
a watermark message parser configured to extract a watermarking message in the descrambled video signal; and
a watermarking CPU configured to watermark the descrambled video signal according to the extracted watermarking message to generate a watermarked video signal, wherein the watermarking message includes a time indicator and unique identifier data associated with the chip; and
a scrambler configured to scramble the watermarked video signal to generate a scrambled video signal, wherein the watermarking CPU is further configured to store the scrambled video signal only in memory inaccessible by the CPU.

11. The chip according to claim 10, wherein the watermarking CPU is further configured to utilize a code or a configuration setting that is signed by an authorized key to watermark the descrambled video signal.

12. The chip according to claim 11, wherein the code or configuration setting is inaccessible to the CPU.

13. The chip according to claim 11, wherein the code or configuration setting is encrypted external to the chip, decrypted, and stored in the memory only in a region of the memory that is inaccessible to the CPU.

14. The chip according to claim 10, wherein the watermarking CPU is further configured to watermark the descrambled video signal in a decompressed domain.

15. The chip according to claim 10, further comprising:
a watchdog timer configured to verify whether the watermarking CPU is enabled.

16. The chip according to claim 10, wherein the watermarking CPU is further configured to store a descriptor corresponding to the watermarking only in the memory that is inaccessible by the CPU.

17. The chip according to claim 10, wherein the watermarking message is inserted in the received video at a head-end.

18. The chip according to claim 17, wherein the inserted watermarking message is encrypted using a unique algorithm.

19. The chip according to claim 18, wherein the watermarking CPU is further configured to remove the inserted watermarking message following a detection of the watermarking message by the watermark message parser.

20. A method for digital media processing in a chip, comprising:
descrambling a received video signal to generate a descrambled video signal;
extracting a watermarking message in the descrambled video signal;
watermarking the descrambled video signal utilizing a first central processing unit (CPU) according to the extracted watermarking message, wherein the watermarking message includes a time indicator and unique identifier data associated with the chip;
scrambling the watermarked video signal; and
storing the scrambled video signal only in memory that is inaccessible by a second CPU.

* * * * *